(12) United States Patent
Brighenti

(10) Patent No.: US 7,151,230 B2
(45) Date of Patent: Dec. 19, 2006

(54) WEIGHING SYSTEM

(75) Inventor: Franco Brighenti, Modena (IT)

(73) Assignee: Societa Cooperativa Bilanciai Campogalliano a Responsabilita Limitata of Modena (IT)

( * ) Notice: Subject to any disclaimer, the term of this patent is extended or adjusted under 35 U.S.C. 154(b) by 211 days.

(21) Appl. No.: 10/774,846

(22) Filed: Feb. 9, 2004

(65) Prior Publication Data
US 2004/0245026 A1 Dec. 9, 2004

(30) Foreign Application Priority Data
May 9, 2003 (IT) .......... MO2003A0134

(51) Int. Cl.
G01G 23/01 (2006.01)
G01G 19/00 (2006.01)

(52) U.S. Cl. .............. 177/25.13; 177/25.14; 177/199; 702/101

(58) Field of Classification Search .......... 73/1.13, 73/1.15; 702/101–102; 177/25.13, 25.14, 177/50, 199–200
See application file for complete search history.

(56) References Cited

U.S. PATENT DOCUMENTS

| | | | |
|---|---|---|---|
| 3,643,753 A * | 2/1972 | Gowin et al. ............... 177/185 |
| 3,969,683 A * | 7/1976 | Fabricius .................... 330/144 |
| 4,788,930 A * | 12/1988 | Matteau et al. ............... 177/16 |
| 4,800,973 A * | 1/1989 | Angel ......................... 177/211 |
| 4,804,052 A | 2/1989 | Griffen ...................... 177/25.14 |
| 4,815,547 A * | 3/1989 | Dillon et al. ............. 177/25.14 |
| 4,842,085 A * | 6/1989 | Lang .......................... 177/164 |
| 4,842,985 A * | 6/1989 | Ono et al. ................... 430/226 |
| H965 H * | 9/1991 | Davis et al. |
| 5,296,655 A * | 3/1994 | Sargent et al. .............. 177/199 |
| 5,481,225 A * | 1/1996 | Lumsden et al. ........... 330/254 |
| 6,326,842 B1 * | 12/2001 | Kuroda ....................... 330/133 |
| 6,721,283 B1 * | 4/2004 | Marino et al. .............. 370/252 |
| 6,919,516 B1 * | 7/2005 | Frye et al. ............... 177/25.13 |
| 2004/0050593 A1 * | 3/2004 | Baeumel et al. |
| 2005/0230157 A1 * | 10/2005 | Tuft |

* cited by examiner

Primary Examiner—Randy W. Gibson
(74) Attorney, Agent, or Firm—Ladas & Parry LLP

(57) ABSTRACT

A system for weighing a load that uses a weighing apparatus comprising a plurality of load cells (1), a means for receiving a load supported by said load cells, a means associated with each load cell (1) to supply a digital representation of the load on each load cell, said load cells being connected together to form a communication network, wherein a digital representation of the load on each load cell (1) is generated, a correction coefficient $X_j$ of said digital representation for each load cell (1) is determined, said correction coefficient $X_j$ is stored in the respective load cell (1) and the gain of each load cell is varied according to its correction coefficient $X_j$ to generate a correct digital representation of the load for each load cell (1).

28 Claims, 11 Drawing Sheets (Continues in Fig. 7)

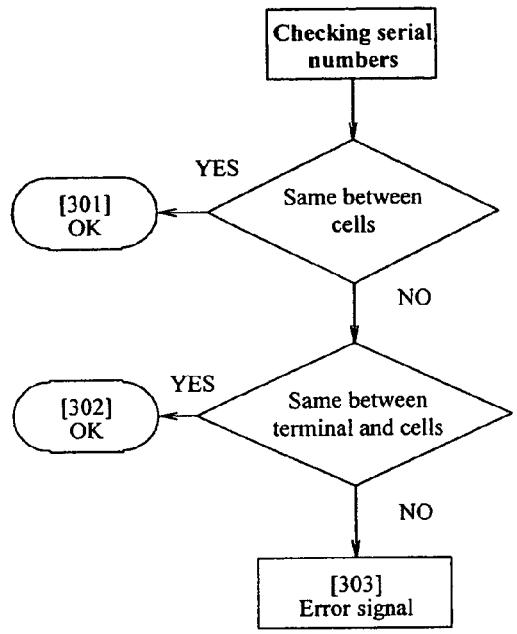
Fig. 8
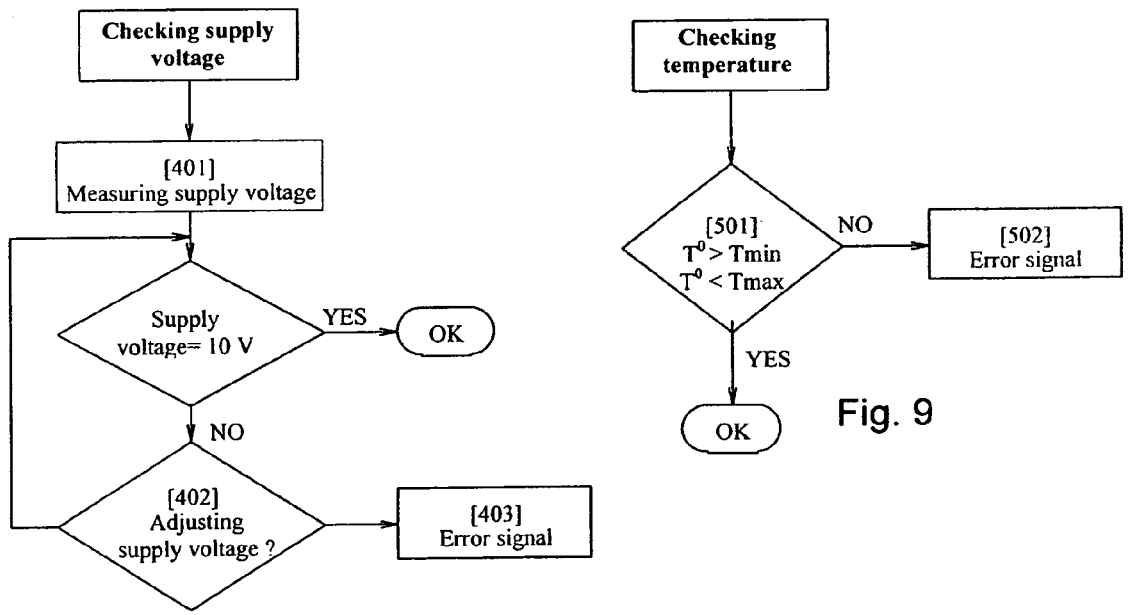
Fig. 9
Fig. 10

(Continues in Fig. 13)

WEIGHING SYSTEM

BACKGROUND ART

This invention concerns a weighing system that uses a plurality of load cells.

Weighing systems of this type normally comprise a platform whereon a load to be weighed must be placed and a series of load transducers, the so-called load cells, located underneath the platform in a preset configuration.

When a load is placed on the platform, the load sensors are prompted, for example, by compression, by traction and by flexure and transmit a signal that is proportionate to the prompting to which they are subjected.

U.S. Pat. No. 4,804,052 describes a prior-art weighing apparatus comprising a plurality of load cells, a load receiver means supported by said load cells, a means associated with said load cells to supply a digital representation of the load lying on each load cell, a means for storing a mathematical expression for the loads that is corrected according to the position of the loads and a means for applying said mathematical expression to said digital representations of the loads to produce a digital representation of the total load on said load receiver means, said digital representation being corrected according to the position of the load.

In other words, for each load cell a correction coefficient of the indication supplied by the load cell is calculated, which is applied at each weighing operation to correct the indications of the different load cells in order to obtain a correct value of the load that is to be measured.

This system has the advantage that the weighing apparatus must always be connected to a dedicated data-processing system which, for each weighing operation, calculates the correct value of the load by applying the so-called correction coefficients to the indications provided by the different load cells. Furthermore, if the data-processing system has to be replaced for any reason the correction coefficients have to be recalculated, which results in loss of time and additional system running costs.

SUMMARY OF THE INVENTION

The aim of this invention is to provide a weighing system that uses load cells, the sum of the indications supplied by the load cells at each weighing operation having to correspond to the corrected load value, without any need for processing by a dedicated data-processing system.

According to a first aspect of this invention a load-weighing method is supplied by means of a plurality of load cells arranged underneath a load platform supported by said load cells, said load cells being connected together in a communication network, said method comprising generating a digital representation of the load on each load cell, determining a correction coefficient of said digital representation for each load cell, varying the gain of each load cell on the basis of said correction coefficient to generate a correct digital representation of the load for each load cell.

According to a further aspect of this invention a weighing apparatus is supplied comprising a plurality of load cells, a means for receiving a load supported by said load cells, a means associated with each load cell to supply a digital representation of the load on each load cell, characterised in that it furthermore comprises a means for varying the gain of each load cell in function of correction coefficients calculated for each load cell to obtain a corrected digital representation of the load on each load cell.

Owing to this invention, it is no longer necessary for a weighing apparatus with load cells to be connected to a dedicated data-processing system to calculate the correct value of the load read by each load cell, inasmuch as the calculated correction coefficients are used to vary the gain of the single load cells, in such a way that the value of the weight read by each load cell is already corrected, without any need for further processing.

The weighing system in question consists of a load receiving device, for example a load platform, that rests on a series of load transducers, for example load cells, that are connected together to form a communication network, a junction box, and possibly, a remote terminal for displaying the weight data.

BRIEF DESCRIPTION OF THE DRAWINGS

In order that the invention may be clearly and completely disclosed, reference will now be made to the accompanying drawings, wherein:

FIGS. 3 to 14 are flow diagrams that illustrate the operation of the system according to the invention.

DESCRIPTION OF THE PREFERRED EMBODIMENTS

Figure 1:
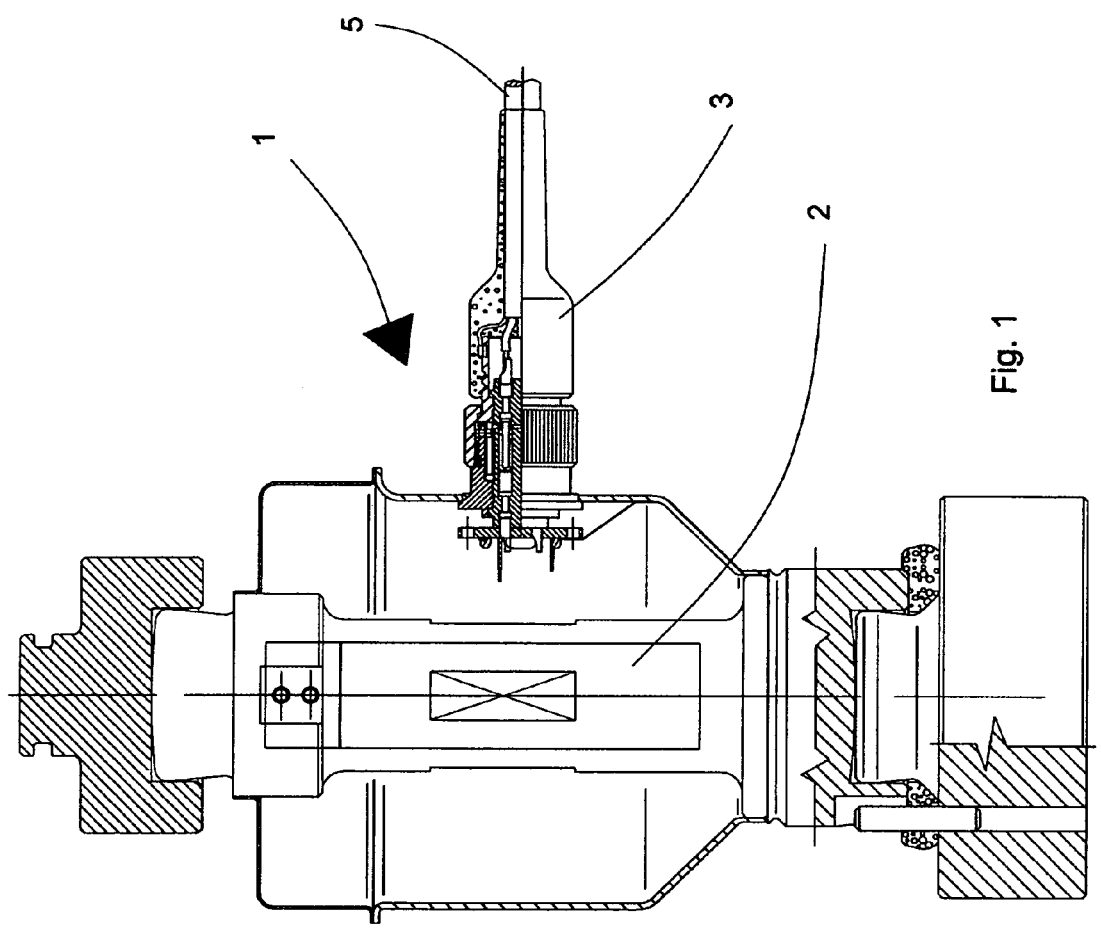
FIG. 1 is a diagrammatic view of a load cell of the system according to the invention.
Figure 2:
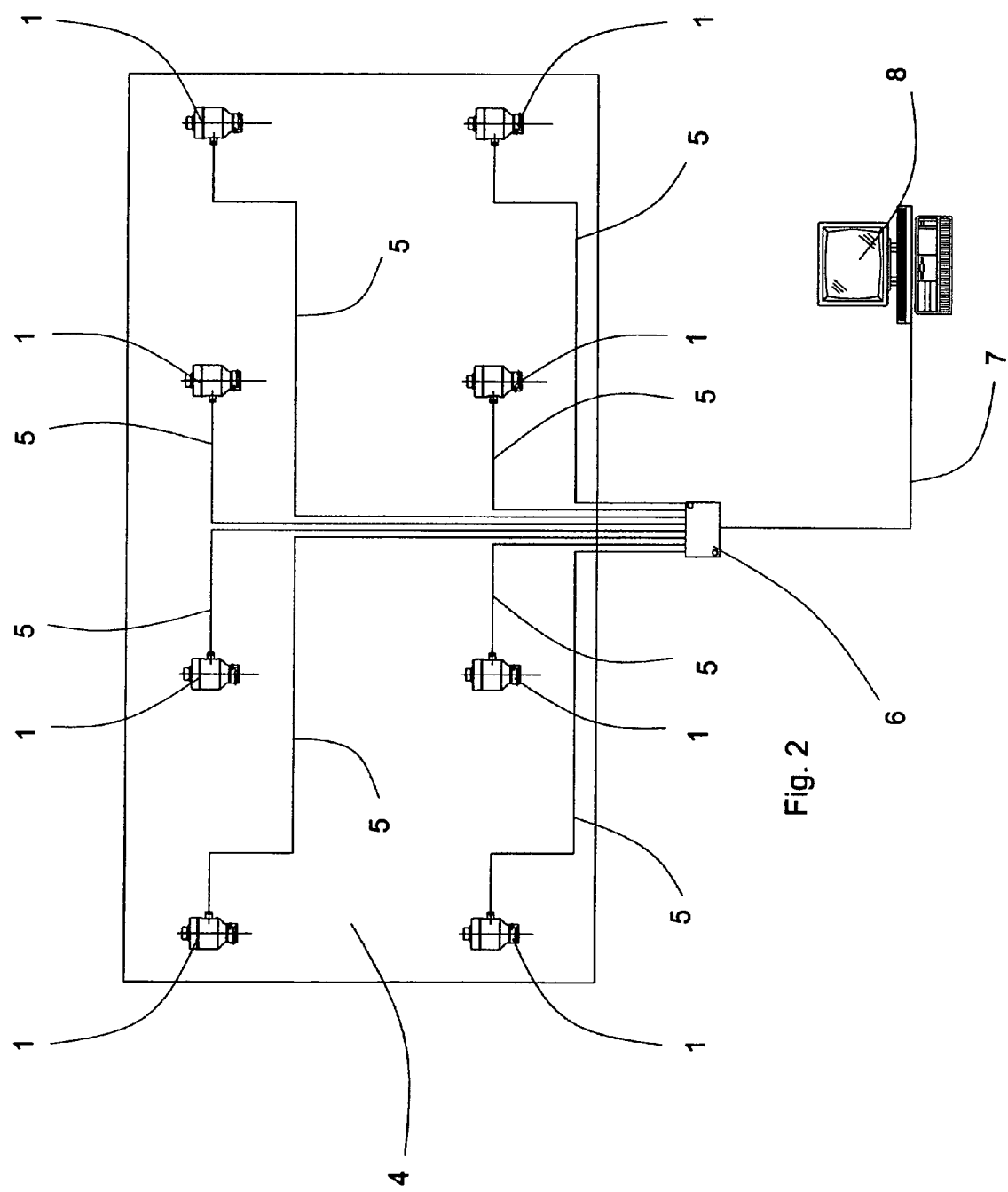
FIG. 2 is a diagrammatic view of the arrangement and of the connections of the load cells in a system according to the invention.
Figure 3:
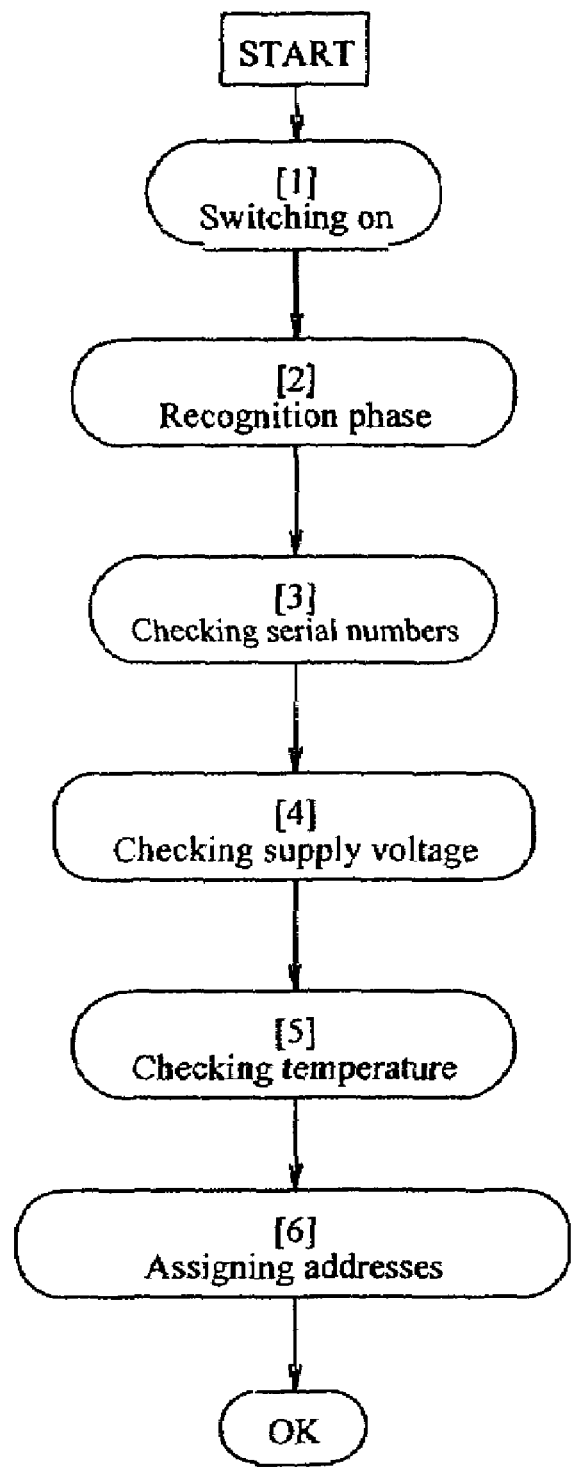
Figure 4:
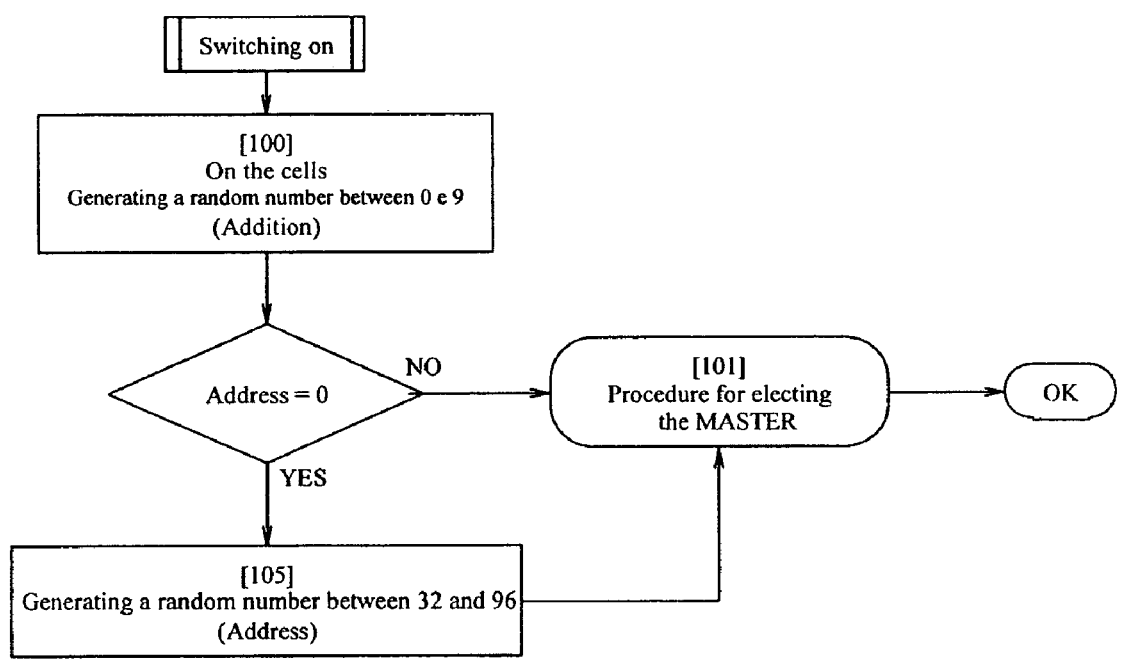
Figure 5:
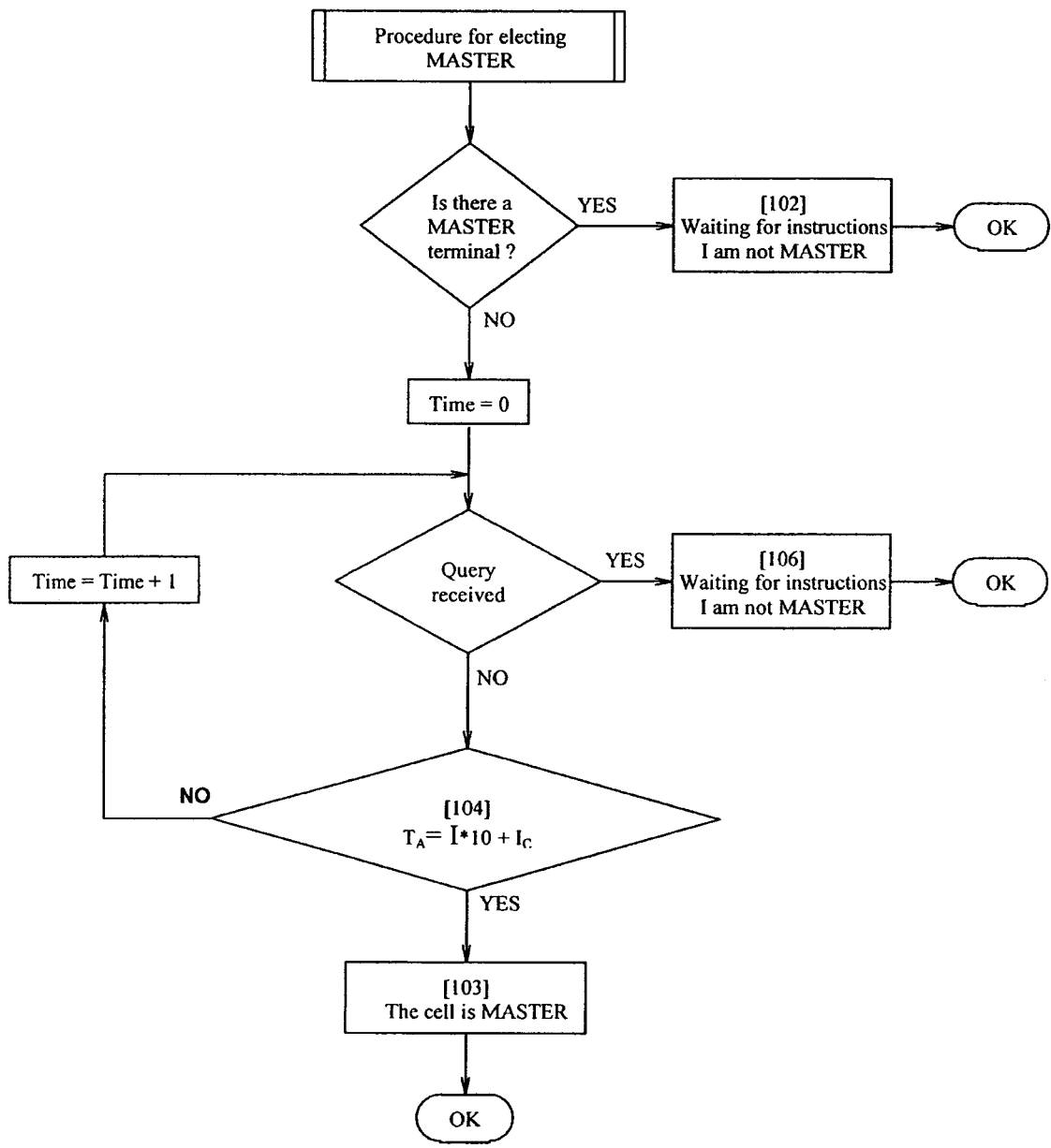
Figure 6:
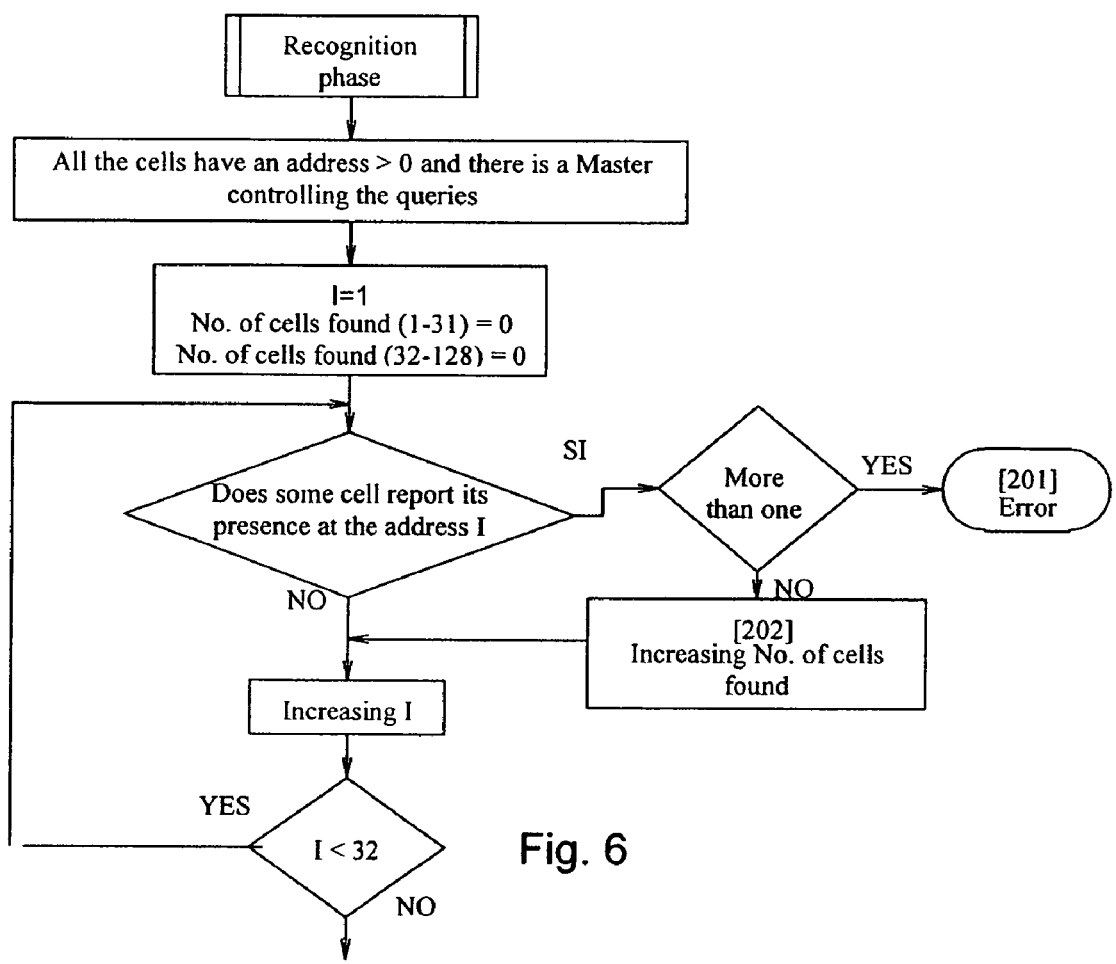
Figure 7:
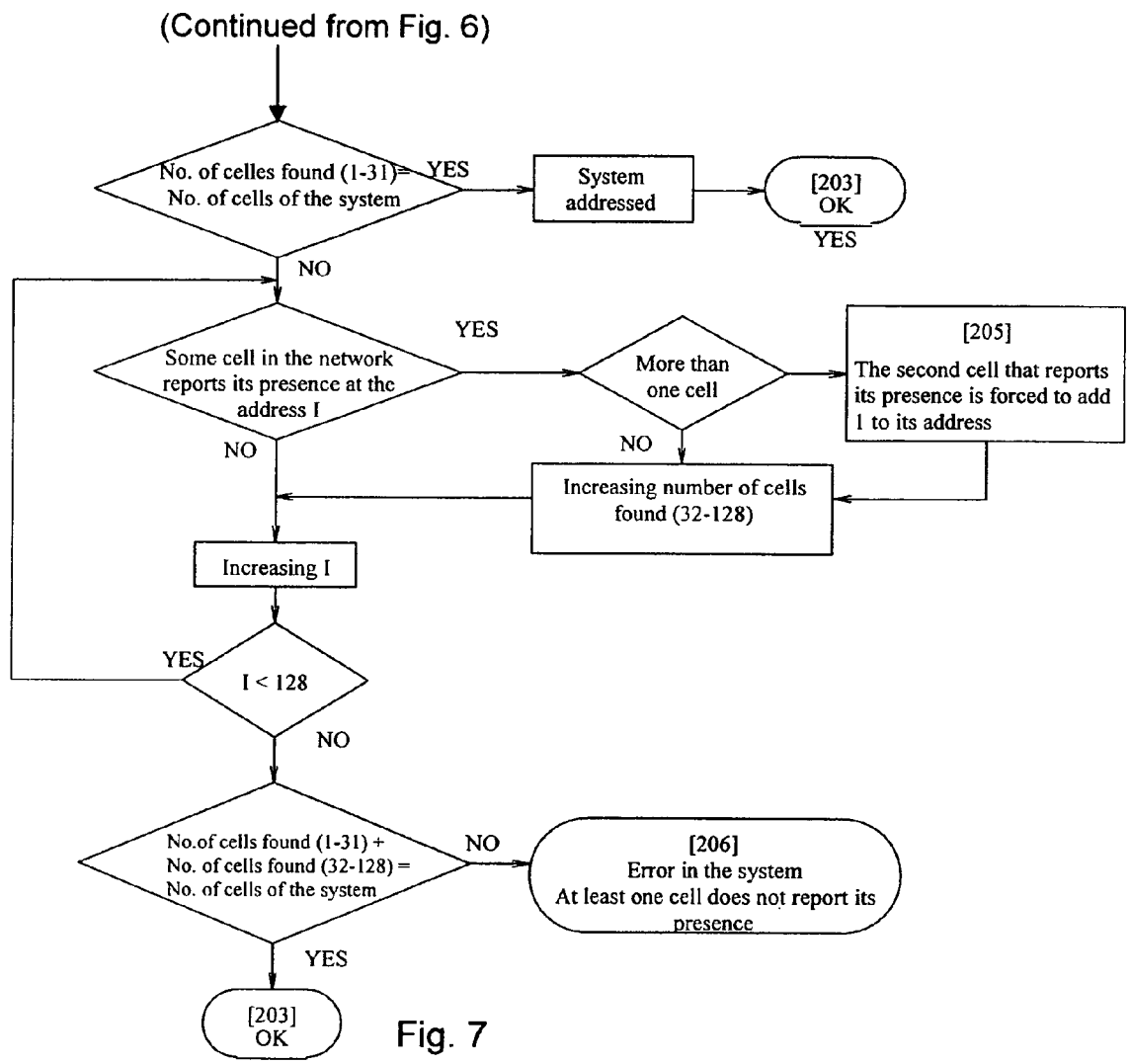
Figure 12:
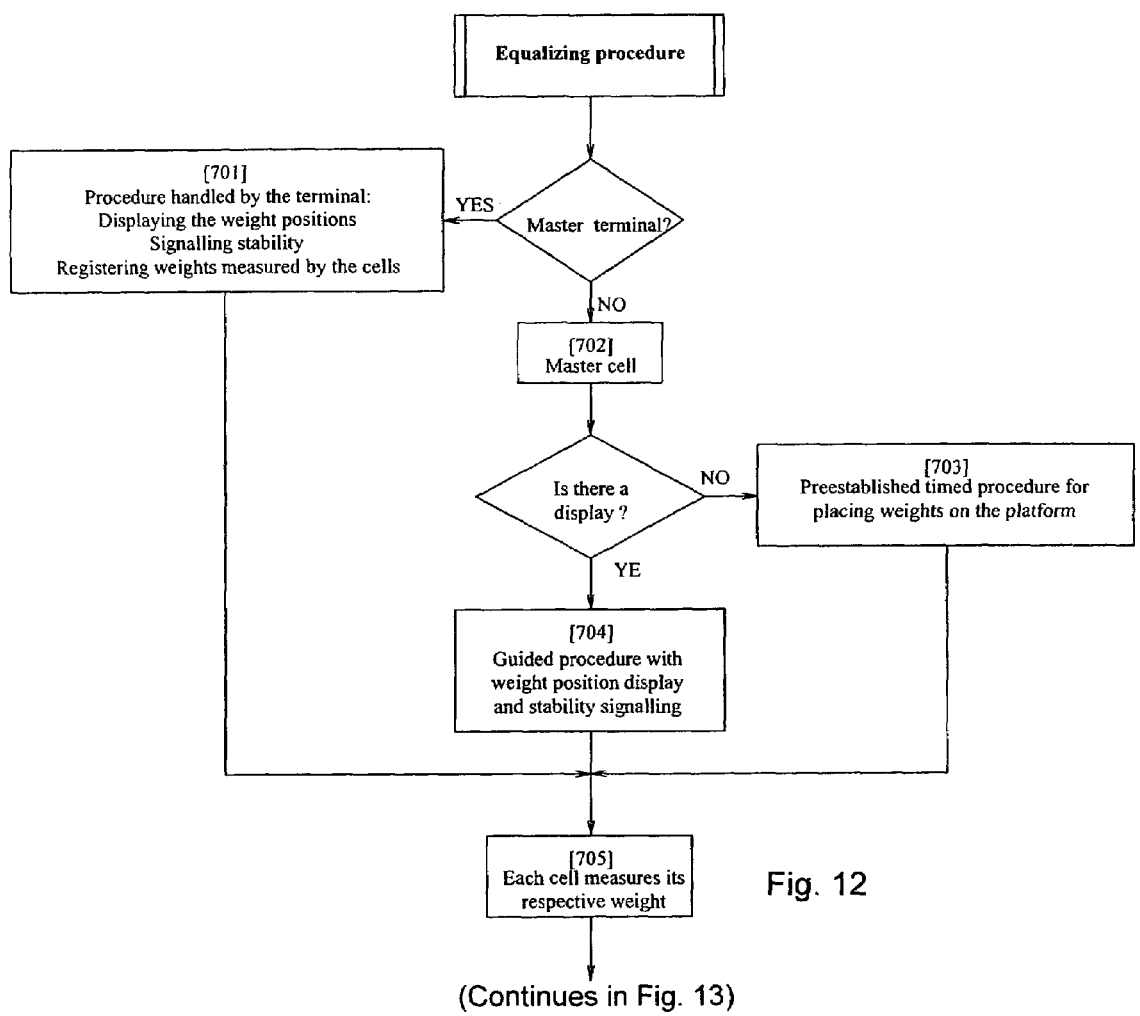
Figure 13:
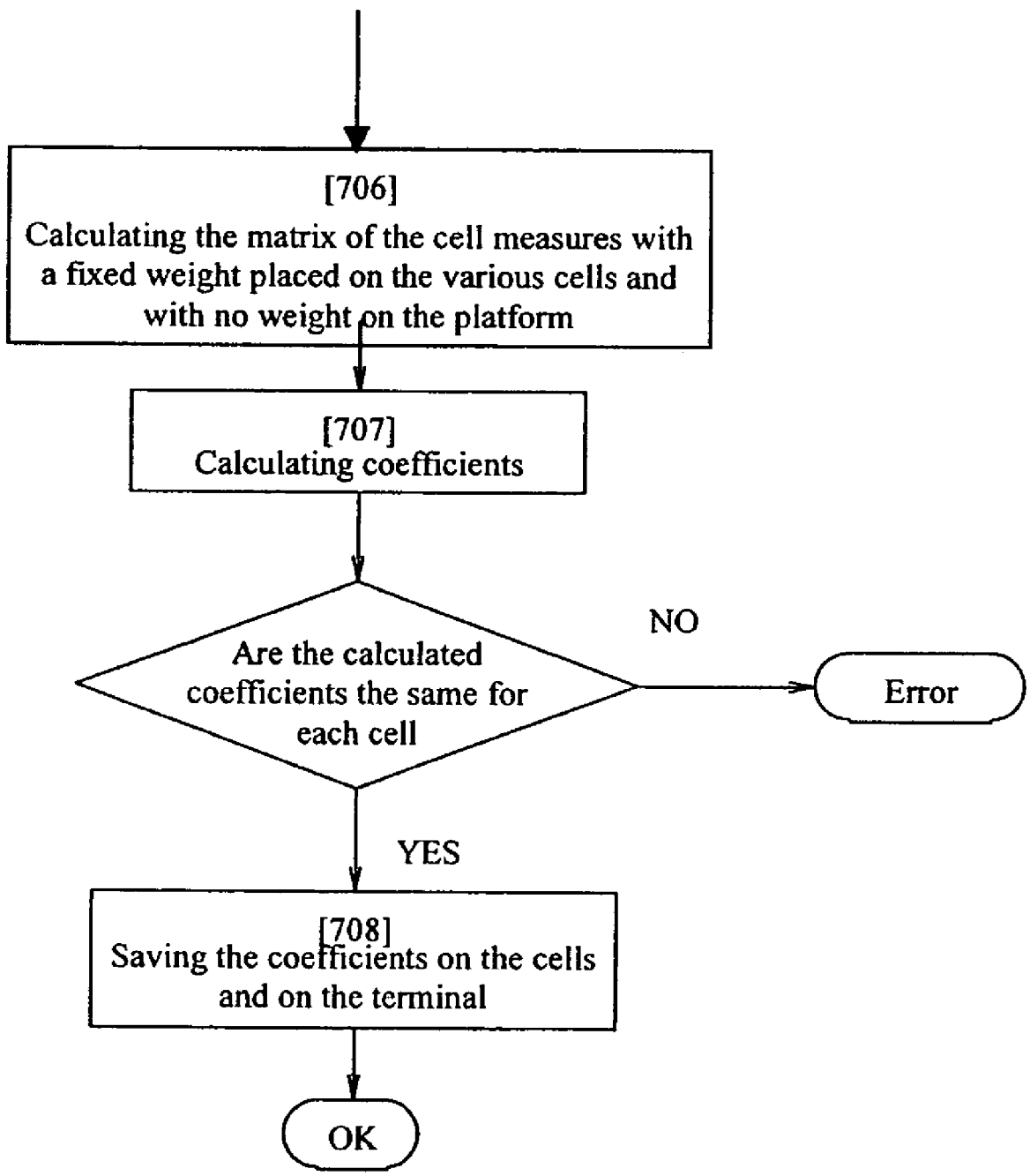
Figure 14:
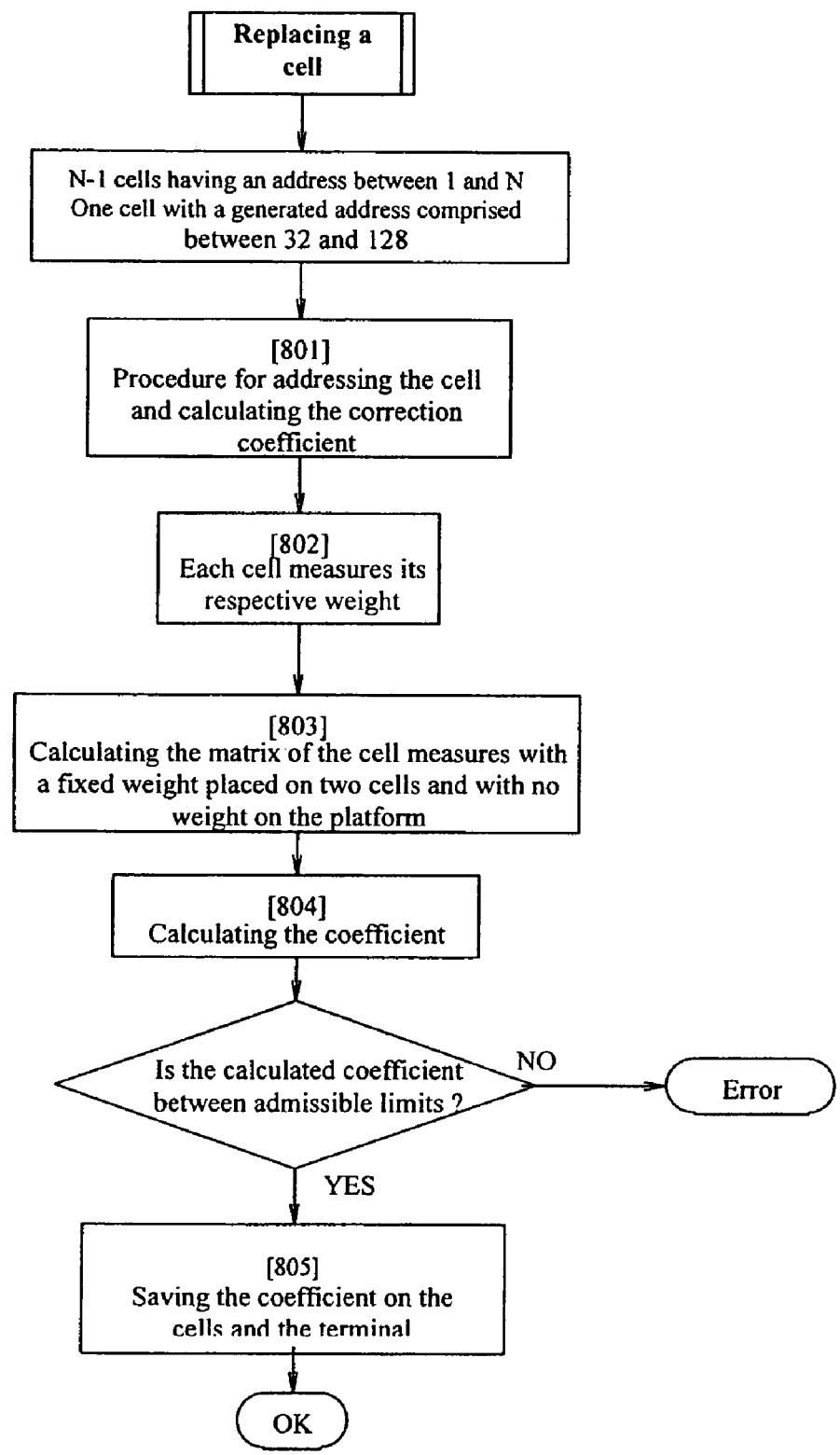

In the weighing system according to the invention, each load cell 1 is equipped with an electronic card 2, fitted inside thereof, on which the following items are fitted:
- an amplification and conversion circuit with variable gain via software;
- a microprocessor and memory circuits
- a communication interface for managing the communication network.

Alternatively, said circuits may be fitted inside a junction box.

The circuits fitted on the electronic card enable management of communication between the system load cells, management of the gain of the amplifier/converter of each load cell, and control of operating parameters such as temperature, supply voltage, tilt, number of connected cells and serial number.

Each load cell consists of a series of electric extensometers with a Wheatstone bridge connection, glued onto a metal testpiece, the shape of which depends on the type of application and on the value of the maximum applicable load. The force applied to the metal testpiece generates a deformation thereof and said deformation is transferred to the extensometric bridge, generating a corresponding variation in resistance values.

By powering the bridge with voltage it is thus possible to convert the mechanical deformation into an electric signal that is transmitted to the electronic card.

On the card, the signal is amplified by the amplification circuit and is then converted by an analogue/digital converter into a digital signal that is suitable for being processed by microprocessor devices.

A second amplification and conversion channel enables a temperature sensor to be read and managed.

Software algorithms enable the digital output of the load cell to be standardised in function of the load applied and of the temperature detected; these algorithms are calibrated during the cell-manufacturing phase. Also during the manufacturing phase, a unique serial number is assigned that enables future recognition of the load cell, and also identifies its production batch and the model.

During this phase, two further parameters are initialised with default values:

correction factor of amplification circuit gain. This value is initialised at 1, i.e. the gain of the amplification circuit is initialised at a preset value, which is set during the construction phase of the circuit and is the same for all cells; modifying this correction factor will enable the gain of the amplification circuit of the respective load cell to be subsequently varied;

address of the load cells. This value is initialised at the value 0; in other words it is not initially assigned to any address that is specific to the load cells. Subsequently, during the operation of systems with several load cells connected together, this parameter is assigned a value other than zero and which is different for each load cell, as will be explained below.

Each load cell is equipped with serial communication devices 3, that enable connection with other load cells 1 and/or with remote devices 8, such as for example PCs, PLCs or dedicated weighing terminals. Said devices enable point-to-point or networked connection with a multimaster protocol with management of conflicts.

As seen previously, each load cell 1 is manufactured with a 'standardised' output, but when a plurality of load cells 1 is connected to the same load receiver it may be necessary to correct the output of the individual cells 1 to compensate differences in detecting the load due to phenomena connected with assembly, such as for example tilt or differences in level or differing gravity acceleration of the place of installation compared with the place of production.

A variable number n of load cells 1, as described previously, is connected by a serial communication network to a junction box 6. The junction box, in addition to simplifying the electrical connection, enables a balanced electric termination of the communication network to be installed. An external device 8 can also be connected to the junction box by means of a connection means 7, to display and feed the group of load cells 1. Said display device 8 may be a dedicated weighing terminal or any device equipped with a serial communication door suitable for being networked and equipped with a source of power for the load cells.

When the system is switched on, recognition and checking procedure is started up to identify each load cell 1 and establish whether it has been calibrated or not on the basis of the address stored therein.

Above all, the microprocessor of each load cell 1 checks whether the cell 1 has already been assigned an address I, consisting of an order number other than zero, corresponding to the position of the cell 1 under the load platform 4. If, for example, the system provides for a maximum number of load cells 1 amounting to n, said order number shall be comprised between 1 and n. For the sake of simplicity, reference will be made below to a system that provides for a maximum number of load cells 1 amounting to 31, but the system according to the invention can provide for any number of load cells 1.

If a cell 1 has an address I that is the same as zero, the microprocessor of the cell 1 generates a random number that is greater than 31, for example between 32 and 96, which becomes a provisional address of the cell.

For each cell 1, a further random number $I_C$ comprised between 0 and 9 is furthermore generated that will hereinafter be defined as an increment, the function of which will be described below. Subsequently, the system selects a network element consisting of the cells 1 and possibly of a weighing terminal 8 dedicated as a master terminal, i.e. as a pilot element, for subsequent operations that the system will have to perform.

The master terminal is selected on the basis of the access time to the network of each network element: in other words, the element that first accesses the network is designated as the master terminal.

Access time $T_A$ to the network of each load cell 1 is established by the microprocessor of the cell, on the basis of the address I of the cell 1 and of the previously mentioned increment $I_C$, according to the following formula:

$$T_A = I \times 10 + I_C$$

In this way, the cells 1 will access the network at different times.

If a dedicated terminal 8 is current, its access time to the network is always less than the access time of each cell 1, in such a way that the dedicated terminal 8 is always designated by the system as a master terminal.

If there is no dedicated terminal 8, the cell 1 that first accesses the network will act as master terminal.

After the system has designated the master terminal, a recognition and checking phase of the cells 1 are recognised is run to monitor above all that all the cells 1 have a different address, to count the number of cells 1 in the system and to check whether each cell 1 has already been equalised on the basis of its position underneath the load platform 4, or must still be equalised.

For this purpose, the master terminal starts to query the network to check whether for each address I between 1 and 31 cells 1 exist to which said address I has been assigned, i.e. cells 1 that have already been equalised on the basis of their position underneath the load platform 4.

Each cell 1 that has an address I comprised between 1 and 31 reports its presence to the master terminal.

At the end of the query, the master terminal above all checks that no cells 1 have the same address, in which case it reports an error condition, inasmuch as no two cells 1 can have the same position underneath the load platform 4.

If no error condition is found the master terminal counts the number of cells 1 that have replied positively to the query and compares this number with the number of cells provided for the system. If the two numbers correspond, it means that all the cells 1 have already been equalised and that the system is ready for conducting weighing operations.

Before enabling the system for weighing operations, the master terminal again checks that the serial numbers of the individual cells 1 correspond to those stored on the cells 1 and on the master terminal, when the latter is a dedicated terminal. If one or more serial numbers do not correspond to those stored, an error condition is reported.

If the number of cells 1 with an address I is less than the number of cells 1 for which the system is designed it means that one or more cells 1 have not yet been equalised on the basis of their position underneath the load platform 4.

This occurs when one or more cells 1 have been replaced since the system was last switched on, or when the system is switched on for the first time and all the cells 1 must still be equalised. In the latter case the master terminal will have detected that no cell 1 exists with an address I comprised between 1 and 31.

If the master terminal detects that one or more cells 1 are not equalised it continues to query the network about the addresses I' comprised between 32 and 96 in order to identify the cells 1 that have not yet been equalised.

If two load cells have the same address, a network communication conflict will occur: at this point the cells that have not yet been addressed will proceed to generate access time Ta afresh, which is required to resolve the communication conflict. This operation is repeated each time that the master terminal identifies two cells 1 that have the same address, until all the identified cells 1 are found to have different addresses.

After identifying the cells that have not yet been equalised, the master terminal checks that the sum of the number of equalised cells 1 and of the number of non-equalised cells corresponds to the number of cells 1 for which the system has been designed, and if there is no correspondence it reports an error condition.

After recognising all the cells 1 in the system and checking that their number is correct, the master terminal starts a procedure to check the voltage supplied to each load cell 1. Per each cell 1, an A/D converter detects the value of the voltage supplied to the cell 1 and checks that it falls within a set range of values. If said value falls outside said range a signal is sent to the main power unit of the cell 1, which will try to vary its output voltage to bring back the value of the voltage supplied to the cell 1 within said range. If this is not possible, an error condition is reported.

Checking the voltage supplied to each cell 1 enables a sufficiently constant supply voltage to be obtained for all cells 1, regardless of the length of the cables connected to the power unit and enables overheating due to an excess supply voltage or faults due to insufficient supply voltage to be avoided.

After the supply voltage has been checked, temperature sensors inside each cell 1 are used to test the temperature within each cell 1, reporting a fault condition if the temperature is not comprised within a preset range.

After the phase of checking the supply voltage and the temperature of the cells 1 has been terminated, if there are one or more non-equalised cells in the system the master terminal starts up a procedure for equalising the cells.

This equalisation procedure consists of identifying the position of the cell 1 underneath the load platform and of calculating a correction coefficient of load cell 1 gain. This coefficient, which will be used to correct the weight indication supplied by the load cell 1, is used to take account of the cell assembly conditions 1, i.e. any deviation of the load cell 1 from an ideal assembly condition, for example deviations from a perfectly vertical condition, or differences in level in relation to an ideal reference plane.

A description of the equalisation procedure in two cases follows:
- complete equalisation of the system, i.e. equalisation of all the cells 1 in the system;
- equalisation of a single cell 1 that has been replaced in a system that has otherwise already been equalised.

The equalisation procedure for a master terminal consisting of a dedicated weighing terminal, or for a master terminal consisting of one of the load cells 1 will also be described.

Complete Equalisation of the System with Master Terminal Consisting of a Dedicated Weighing Terminal This procedure is carried out when none of the load cells 1 is equalised, i.e. when the system is switched on for the first time after assembly of the load cells 1 underneath the platform 4, or when two or more non-equalised load cells 1 are detected. In this case, all the load cells 1 that were previously identified, or at least two load cells 1, have addresses comprised between 32 and 96.

Above all, when there is no load on the load platform each cell stores its own weight indication and communicates it to the weighing terminal 8.

Subsequently, the weighing terminal 8 indicates to an operator that he should set a weight value not defined in a first preset position on the load platform 4, corresponding to the position of a first load cell 1 underneath the load platform.

The load cells 1 store the new weight indication detected with the load in said first preset position and communicate it to the weighing terminal 8.

The operation is repeated by subsequently shifting the load to the other load cells 1, according to a preset route and each time the load cells 1 store the respective weight indications and communicate them to the weighing terminal 8.

At the end of these operations, for each load cell 1 N+1 weight indications will be stored on the weighing terminal 8, one of which weight indications corresponds to the empty load, i.e. the weight indication without a load on the platform 4 and the others correspond to the different load positions, one for each cell 1, on the load platform 4.

The weighing terminal 8 is now able to calculate for each load cell 1 and for each load position platform 4 the difference between the empty weight indication and the weight indication with the weight on the platform 4. This difference, for each cell 1, will be greatest for the load position on the platform 4 corresponding to the position of the cell 1 underneath the platform 4. In this way the master terminal is able to identify the position of each cell 1 underneath the platform and to assign to each cell a new address consisting of a number between 1 and 32 that identifies the position of the load cell 1 underneath the load platform 4.

The weighing terminal 8 then calculates for each cell 1a correction coefficient of the load indication, which will be used to correct the load cell 1 indication, taking into account the position of the cell underneath the load platform, any deviations from a perfectly vertical condition and any differences in level in the assembly position in relation to an ideal reference plane.

This correction coefficient is calculated by setting and resolving a system of n equations in n unknown quantities, each one of which is of the type:

$$B_i = N_{i1}X_1 + N_{i2}X_2 + \ldots + N_{in}X_n$$

Where $N_{ij}$ is the weight indication supplied by the cell 1 in position "j" when the weight is placed on the platform in position "i", $X_j$ is the value of the correction coefficient for the cell in position "j", $B_i$ is the known term of the equation and is equal to the average of the sum of the different weights $N_{ij}$ detected for the different load positions on the platform 4. This calculation can be made not only by the weighing terminal 8 but can also be made independently by each load cell 1 and the results can be compared to check the consistency of the calculations.

The value of each correction coefficient $X_j$ is then compared with the ideal value, initially set at one, to check that it does not deviate therefrom by more than a preset amount, in which case an error condition is reported, which may depend on excessive tilt of the load cell in relation to the ideal perfectly vertical condition or on incorrect assembly of the cell.

Each correction coefficient $X_j$ is then stored in the respective load cell 1 and is used to vary the gain of the amplification circuit of the cell 1. In this way, the indication that will be subsequently supplied by the load cell 1 at each weighing operation will have already been corrected on the basis of said correction coefficient $X_j$ without any need for the weighing terminal 8 to make any correction to the indications supplied by the load cells 1.

Initial Equalisation of the System with Master Terminal Consisting of One of the Load Cells In this case, if the system is connected to a display terminal 8, the load cell 1 that has taken on the function of master terminal starts up and manages the equalisation procedure by displaying on the terminal 8 the indications of the subsequent positions on which the operator has to place the load on the platform 4. In all other respects, the procedure runs as described above, with the load cell 1 that acts as a master terminal performing the same functions as the weighing terminal. Throughout the procedure the display terminal 8 plays a purely passive role of displaying messages and data without intervening in equalisation operations.

Finally, if there is no display terminal 8, the weight is positioned in the different positions on the platform 4 by the operator's placing the weight in the different positions according to a preset pattern and leaving the weight in each position for a preset minimum time.

Equalisation of a Single Cell that has Replaced a Faulty Cell in a System that has Otherwise Already been Equalised In this case, when the system first starts up after the insertion of a new cell 1, the master terminal detects that one of the cells 1 has an address that is greater than 31, which indicates that it is a cell 1 that has not yet been equalised.

The test weight is placed on the load platform 4 in the position corresponding to the new cell 1 and in another reference position, corresponding for example to the cell 1 that is furthest from the new cell. The load values are then stored that were detected by the respective load cells 1 and the difference between these load values and the empty load value is then calculated.

n×2 load values are thus obtained by means of which an equation can be set that is the same as the previously mentioned equation, wherein the only unknown quantity is the correction coefficient $X_j$ of the new cell 1, which at this point, will be stored in the cell to vary the gain of the cell at each weighing operation and on any dedicated weighing terminal 8.

Also in this case the calculation of the value of $X_j$ is made independently of all the cells 1 and the results are compared together and with the reference value 1 of the correction coefficient.

If the results obtained by the different cells 1 are not the same or if the calculated value of $X_j$ deviates from the value 1 by a quantity that is greater than a preset quantity, an error condition is reported.

In the practical embodiment, the materials, dimensions and executed details may be different from those indicated, but be technically equivalent and still fall within the legal scope of this invention.

What is claimed is:

1. A method of weighing a load by means of a weighing apparatus comprising a plurality of load cells arranged underneath a load platform supported on said load cells, said load cells being connected together to form a communication network, said method comprising generating a digital representation of the load on each load cell, determining a correction coefficient $X_j$ of said digital representation for each load cell, storing said correction coefficient $X_j$ in the respective load cell and varying the gain of each load cell on the basis of the respective correction coefficient $X_j$ to generate a correct digital representation of the load for each cell, each load cell detecting its own address I and checking that said address I is other than zero, whenever said weighing apparatus switches on, wherein if said address I is the same as zero, the load cell generates and stores its own address I consisting of a number selected at random from a range comprised between n+1 and m, n being the maximum number of load cells for which said apparatus is designed.

2. A method according to claim 1, wherein each load cell generates and stores a random number $I_C$ comprised between 0 and 9.

3. A method according to claim 1, furthermore comprising checking whether said apparatus comprises a master terminal.

4. A method according to claim 3, wherein, if said apparatus does not comprise a master terminal, one of the load cells acts as a master terminal.

5. A method according to claim 4, wherein the cell that acts as a master terminal is the one that first accesses said communication network, the access of each cell to said communication network occurring at an access time equal to $T_A = I \times 10 + I_C$.

6. A method according to claim 3, wherein said master terminal queries said communication network to check if cells exist with an address comprised between 1 and n.

7. A method according to claim 6, wherein if two or more cells have an address that is the same and is comprised between 1 and n, an error signal is generated.

8. A method according to claim 6, wherein, at the end of said query, the master terminal checks whether the number of cells with an address comprised between 1 and n is the same as or less than the total number of cells of the weighing apparatus.

9. A method according to claim 8, wherein, if the number of cells with an address comprised between 1 and n is less than the total number of cells of said weighing apparatus, the master terminal carries out a further query of said communication network to check if cells exist with a address comprised between n+1 and m.

10. A method according to claim 9, wherein at the end of said further query, the master terminal checks whether the total number of cells identified corresponds to the total number of cells of said weighing apparatus and generates an error signal if there is no correspondence between said two total numbers.

11. A method according to claim 1, furthermore comprising checking whether the voltage supplied to each load cell is comprised within a preset range.

12. A method according to claim 10, furthermore comprising regulating said supply voltage to bring it back within said preset range if its value does not fall within said preset range and generating an error signal if it is not possible to bring said value back within said preset range.

13. A method according to claim 1, furthermore comprising checking the temperature of each load cell, to make sure that it is comprised within a preset temperature range and generating an error signal if said temperature is not comprised within said preset range.

14. A method according to claim 1, furthermore comprising enabling said apparatus for operation if the addresses of all the cells are comprised between 1 and n.

15. A method according to claim 1, wherein if no cell has an address comprised between 1 and n, said correction coefficient $X_j$ is calculated for each one of said load cells.

16. A method according to claim 1, wherein if two or more cells have an address that is not comprised between 1 and n, aid correction coefficient $X_j$ is calculated for all the load cells of said weighing apparatus.

17. A method according to claim claim 1, wherein the following procedure is used to calculate said correction coefficient $X_j$:
- each load cell detects its own weight indication if there is no load on said load platform, it stores a digital representation thereof and communicates said digital representation to the master terminal;
- a weight is placed in a preset first position on said load platform and each load cell detects its own weight indication, stores a digital representation thereof and communicates said digital representation to the master terminal, said first preset position corresponding to the position of one of said cells underneath said load platform;
- said weight is subsequently shifted to further preset positions, each one of which corresponds to the position of a different load cell underneath said load platform and each load cell detects its own weight indication for each one of said further preset weight positions, it stores a digital representation thereof and communicates said digital representation to the master terminal.

18. A method according to claim 17, wherein each load cell calculates the differences between the digital representation of its own load indications for each one of said preset positions and the digital representation of its own load indication if there is no load on said load platform, stores said differences and communicates them to the master terminal.

19. A method according to claim 18, wherein the master terminal identifies the position of each load cell underneath said load platform, the position of each load cell corresponding to the position of the weight on the load platform for which said difference is at its greatest.

20. A method according to claim 19, wherein said master terminal assigns to each load cell an address comprised between 1 and n, corresponding to the position of the load cell underneath the load platform.

21. A method according to claim 1, wherein said coefficients $X_j$ are calculated by the master terminal and by each cell resolving a system of n equations in n unknown quantities wherein each equation has the following form:

$$B_i = N_{i1}X_1 + N_{i2}X_2 + \ldots + N_{in}X_n$$

$N_{ij}$ being the digital representation of the weight indication supplied by the cell in position "j" when the sample weight is placed on the platform in position "i", $X_j$ is the value of the correction coefficient for the cell in position "j", $B_i$ is the known term of the equation and is equal to the average of the sum of all the $N_{ij}$.

22. A method according to claim 1, wherein if just one load cell has an address that is not between 1 and n, said correction coefficient $X_j$ is calculated for said sole load cell.

23. A method according to claim 22, wherein this procedure is followed to calculate said correction coefficient $X_j$:
- said just one load cell with an address that is not comprised between 1 and n on said load platform, stores a digital representation thereof and communicates said digital representation to the master terminal;
- a weight is placed in a preset first position on said load platform and said just one load cell detects its own weight indication, stores a digital representation thereof and communicates said digital representation to the master terminal, said first preset position corresponding to the position of one of said cells underneath said load platform;
- said weight is subsequently shifted to further preset positions, each one of which corresponds to the position of a different load cell underneath said load platform and said just one load cell detects its own weight indication for each one of said further preset weight positions of the sample weight, stores a digital representation thereof and communicates said digital representation to the master terminal.

24. A method according to claim 23, wherein said just one load cell calculates the differences between the digital representations of its own load indications for each one of said preset positions and the digital representation of its own load indication if there is no load on said load platform, stores said differences and communicates them to the master terminal.

25. A method according to claim 24, wherein the master terminal identifies the position of said just one load cell underneath said load platform, the position of said sole load cell corresponding to the position of the weight on the load platform for which said difference is at its greatest.

26. A method according to claim 25, wherein said master terminal assigns to said just one load cell an address between 1 and n, corresponding to the position of the just one load cell underneath the load platform.

27. A method according to claim 26, wherein said weight is placed on said load platform in a position corresponding to the position of said just one load cell and in a position corresponding to a position of another cell that is the furthest from said just one load cell and said just one load cell stores its own weight indications for said two positions, calculating the respective differences between said weight indications and its own weight indication if there is no load on the platform.

28. A method according to claim 27, wherein said correction coefficient $X_j$ for said just one load cell is calculated by using an equation according to claim 21.

* * * * *